(12) United States Patent
Yu

(10) Patent No.: US 11,106,649 B2
(45) Date of Patent: Aug. 31, 2021

(54) ELECTRONIC APPARATUS, DATA CHAIN ARCHIVING METHOD, SYSTEM AND STORAGE MEDIUM

(71) Applicant: PING AN TECHNOLOGY (SHENZHEN) CO., LTD., Guangdong (CN)

(72) Inventor: Minghao Yu, Guangdong (CN)

(73) Assignee: PING AN TECHNOLOGY (SHENZHEN) CO., LTD., Shenzhen (CN)

(*) Notice: Subject to any disclaimer, the term of this patent is extended or adjusted under 35 U.S.C. 154(b) by 10 days.

(21) Appl. No.: 16/632,552

(22) PCT Filed: Jun. 1, 2018

(86) PCT No.: PCT/CN2018/089458
§ 371 (c)(1),
(2) Date: Jan. 21, 2020

(87) PCT Pub. No.: WO2019/169764
PCT Pub. Date: Sep. 12, 2019

(65) Prior Publication Data
US 2020/0242098 A1 Jul. 30, 2020

(30) Foreign Application Priority Data
Mar. 6, 2018 (CN) .......................... 201810183496.9

(51) Int. Cl.
*G06F 16/22* (2019.01)
*G06F 16/245* (2019.01)
(Continued)

(52) U.S. Cl.
CPC ........ *G06F 16/2282* (2019.01); *G06F 16/113* (2019.01); *G06F 16/221* (2019.01); *G06F 16/245* (2019.01); *G06F 16/278* (2019.01)

(58) Field of Classification Search
CPC .. G06F 16/113; G06F 16/221; G06F 16/2282; G06F 16/245; G06F 16/278; G06F 16/282
See application file for complete search history.

(56) References Cited

U.S. PATENT DOCUMENTS 6,223,182 B1 * 4/2001 Agarwal ............... G06F 16/284
9,823,982 B1 * 11/2017 Schwartz .............. G06F 16/185
(Continued)

FOREIGN PATENT DOCUMENTS

CN 101593202 A * 12/2009 ......... G06F 16/2456
CN 103262074 A * 8/2013 ......... G06F 16/2456
(Continued)

*Primary Examiner* — James E Richardson

(57) ABSTRACT

The present application relates to a data chain archiving method. The method includes: dividing an original data table in a database into partitions, and writing finished data in the partitions into a first temporary table according to a predetermined first processing mode by utilizing preset parallel threads; obtaining data with superior and subordinate association in the first temporary table by utilizing a single thread after the data is written in the first temporary table, and writing the data with the superior and subordinate association into a second temporary table; and dividing the second temporary table into preset partitions after all the data in the first temporary table is processed, archiving the data in the partitions of the second temporary table into a pre-established archive table in the database according to a predetermined second processing mode by utilizing preset parallel threads.

20 Claims, 2 Drawing Sheets

(51) Int. Cl.
*G06F 16/27* (2019.01)
*G06F 16/11* (2019.01)

(56) References Cited

U.S. PATENT DOCUMENTS

| | | | | |
|---|---|---|---|---|
| 10,198,495 | B1* | 2/2019 | Bailey | G06F 16/2282 |
| 10,409,770 | B1* | 9/2019 | Ye | G06F 16/27 |
| 2005/0187897 | A1* | 8/2005 | Pawar | G06F 16/2282 |
| 2012/0124045 | A1* | 5/2012 | Pendap | G06F 16/24554 |
| | | | | 707/737 |
| 2014/0114923 | A1* | 4/2014 | Risso | G06F 16/214 |
| | | | | 707/668 |
| 2015/0142749 | A1* | 5/2015 | Broll | G06F 16/113 |
| | | | | 707/654 |

FOREIGN PATENT DOCUMENTS

| | | | | | |
|---|---|---|---|---|---|
| CN | 103778176 | A | * | 5/2014 | ........... G06F 16/214 |
| CN | 105095384 | A | | 11/2015 | |
| CN | 105279261 | A | * | 1/2016 | ........... G06F 16/214 |
| CN | 105760505 | A | | 7/2016 | |
| CN | 105808633 | A | * | 7/2016 | ........... G06F 16/215 |
| CN | 106383897 | A | * | 2/2017 | ........... G06F 16/215 |
| CN | 108009223 | A | * | 5/2018 | |

\* cited by examiner

US 11,106,649 B2

ELECTRONIC APPARATUS, DATA CHAIN ARCHIVING METHOD, SYSTEM AND STORAGE MEDIUM

CROSS REFERENCE TO RELATED APPLICATIONS

The present application claims a Paris Convention priority to Chinese Patent Application No. CN201810183496.9, filed on Mar. 6, 2018 and entitled "Electronic Apparatus, Data Chain Archiving Method, System and Storage Medium", the entire content of which is incorporated herein by reference.

TECHNICAL FIELD

This application relates to the field of communication technology, and more particularly, to an electronic apparatus, data chain archiving method, system and storage medium.

BACKGROUND

In enterprises, with the increase of business, more and more data in database system is overstocked. The performance of the database system is degraded due to the large amount of overstocked data which directly influences user experience and user operation aging. Therefore, a reasonable and efficient scheme is needed for archiving data. According to the traditional data archiving scheme, data is directly transferred to an archive database. Due to the fact that a quantity of the data is quite large and the data spans two database systems, the data archiving scheme is slow, and the stability of the performance of the database system cannot be maintained.

SUMMARY OF THE DISCLOSURE

The present disclosure provides an electronic apparatus, a data chain archiving method, system and a storage medium, aiming to archive data in a database quickly and efficiently.

To achieve the above objective, an electronic apparatus provided in the present disclosure includes a memory, a processor connected to the memory and a processing system stored on the memory and running on the processor; the processing system, when executed by the processor, performing the following steps:

A first writing step, dividing an original data table in a database into a first quantity of preset partitions, and writing finished data in the partitions into a first temporary table which is pre-established according to a predetermined first processing mode by utilizing a second quantity of preset parallel threads, wherein the first quantity is larger than or equal to the second quantity;

A second writing step, obtaining data with superior and subordinate association in the first temporary table by utilizing a single thread after all the finished data in the partitions is written in the first temporary table, and writing the data with the superior and subordinate association into a second temporary table which is pre-established;

An archiving step, dividing the second temporary table into a third quantity of preset partitions after all the data in the first temporary table is processed by utilizing the single thread, archiving the data in the partitions of the second temporary table into a pre-established archive table in the database according to a predetermined second processing mode by utilizing a fourth quantity of preset parallel threads, and deleting the data correspondingly written in the archive table in the original data table, wherein the third quantity is larger than or equal to the fourth quantity.

To achieve the above objective, the present disclosure further provides a data chain archiving method, including:

S1, dividing an original data table in a database into a first quantity of preset partitions, and writing finished data in the partitions into a first temporary table which is pre-established according to a predetermined first processing mode by utilizing a second quantity of preset parallel threads, wherein the first quantity is larger than or equal to the second quantity;

S2, obtaining data with superior and subordinate association in the first temporary table by utilizing a single thread after all the finished data in the partitions is written in the first temporary table, and writing the data with the superior and subordinate association into a second temporary table which is pre-established;

S3, dividing the second temporary table into a third quantity of preset partitions after all the data in the first temporary table is processed by utilizing the single thread, archiving the data in the partitions of the second temporary table into a pre-established archive table in the database according to a predetermined second processing mode by utilizing a fourth quantity of preset parallel threads, and deleting the data correspondingly written in the archive table in the original data table, wherein the third quantity is larger than or equal to the fourth quantity.

To achieve the above objective, the present disclosure further provides a data chain archiving system, including:

A first writing module, configured for dividing an original data table in a database into a first quantity of preset partitions, and writing finished data in the partitions into a first temporary table which is pre-established according to a predetermined first processing mode by utilizing a second quantity of preset parallel threads, wherein the first quantity is larger than or equal to the second quantity;

A second writing module, configured for obtaining data with superior and subordinate association in the first temporary table by utilizing a single thread after all the finished data in the partitions is written in the first temporary table, and writing the data with the superior and subordinate association into a second temporary table which is pre-established;

An archiving module, configured for dividing the second temporary table into a third quantity of preset partitions after all the data in the first temporary table is processed by utilizing the single thread, archiving the data in the partitions of the second temporary table into a pre-established archive table in the database according to a predetermined second processing mode by utilizing a fourth quantity of preset parallel threads, and deleting the data correspondingly written in the archive table in the original data table, wherein the third quantity is larger than or equal to the fourth quantity.

The present disclosure further provides a computer-readable storage medium with a processing system stored thereon, which, when executed by a processor, is capable of performing the above steps of the method.

The beneficial effects of the present disclosure are that: when data in the database is archived, a chain type multi-thread mode is adopted. The chain type multi-thread mode includes three-step operation, and the next operation can be executed only after each step of operation is completed. In the first step of operation, an original data table is divided and a plurality of parallel threads are adopted to write data into a temporary table. Data conforming to conditions is screened out by utilizing a single thread in the second step of operation. The temporary table is divided in the third step of operation, and the data is archived in an archive table of the database in a mode of multiple parallel threads. Data in the database can be quickly and efficiently archived, and the stability of the performance of the database system is kept.

PREFERRED EMBODIMENTS

For clearly understanding the purpose, technical proposal and advantages of the present disclosure, embodiments are given in detail hereinafter with reference to the accompanying drawings. It should be understood that the specific embodiments described here are used only to interpret the present disclosure and not limit to the present disclosure. All other implementation of the case obtained by one having ordinary skill in the art without creative work should be considered within the scope of the present disclosure for protection.

It should be noted that the descriptions, such as the "first", the "second" in the present disclosure, can only be used to describe the aim, and cannot be understood as indicating or suggesting relative importance or impliedly indicating the number of the indicated technical character. Therefore, the character indicated by the "first", the "second" can express or impliedly include at least one character. In addition, the technical proposal of each exemplary embodiment can be combined with each other, however the technical proposal must base on that the ordinary skill in that art can realize the technical proposal, when the combination of the technical proposals occurs contradiction or cannot realize, it should consider that the combination of the technical proposals does not existed, and is not contained in the protection scope required by the present disclosure.

Figure 1:
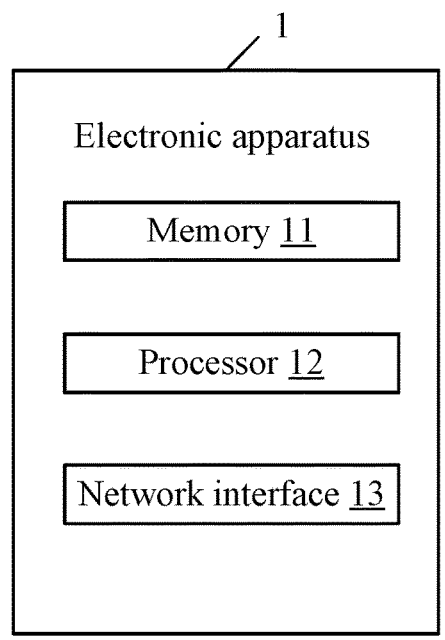
FIG. 1 is a schematic diagram of a hardware configuration of one embodiment of an electronic apparatus according to the present disclosure.

Referring to FIG. 1, it is a schematic diagram of a hardware configuration of one embodiment of an electronic apparatus according to the present disclosure. The electronic apparatus 1 is a device capable of automatically performing numerical calculation and/or information processing according to instructions set or stored in advance. The electronic apparatus 1 may be a computer or a server group consisting of an independent server or a cluster of servers, or a cloud formed by a large number of hosts or network servers based on cloud computing. The cloud computing is one type of distributed computing and is a super virtual computer composed of a group of loosely coupled computer sets.

In the embodiment, the electronic apparatus 1 may include, but is not limited to, a memory 11, a processor 12, a network interface 13. A processing system capable of running on the processor 12 is stored in the memory 11. It should be noted that, FIG. 1 only shows the electronic apparatus 1 with the components 11-13, but it should be understood that not all illustrated components are required to be implemented, and more or fewer components can be implemented instead.

The memory 11 includes an internal storage and at least one type of readable storage medium. The internal storage is used to provide caching for the operation of the electronic apparatus 1. The readable storage medium may be a non-volatile storage medium such as a flash memory, a hard disk, a multimedia card, a card type memory (e.g., SD or DX memory), a random access memory (RAM), a static random access memory (SRAM), a read-only memory (ROM), an electrically-erasable programmable read-only memory (EEPROM), a programmable read-only memory (PROM), a magnetic memory, a magnetic disk, a computer disk, a CD, etc. In some embodiments, the readable storage medium could be an internal storage unit of the electronic apparatus 1, such as a hard disk of the electronic apparatus 1. In other embodiments, the non-volatile storage medium could also be an external storage device of the electronic apparatus 1, such as a plug-in hard disk, a smart media card (SMC), a secure digital (SD) card, a flash card, etc., which are equipped on the electronic apparatus 1. In the present embodiment, the readable storage medium of the memory 11 is usually used to store an operation system and various types of application software installed in the electronic apparatus 1, such as program codes for storing the processing system in one embodiment of the present disclosure. In addition, the memory 11 could also be used to temporarily store various types of data that have been output or are to be output.

The processor 12 can be a central processing unit (CPU), a controller, a microcontroller, a microprocessor, or other data processing chips in some embodiments. The processor 12 is generally used to control the overall operation of the electronic apparatus 1, for example, performing control and processing related to data interaction or communication with other devices. In this embodiment, the processor 12 is used to run program codes or process data stored in the memory 11, such as running a processing system, etc.

The network interface 13 may include a wireless network interface or a wired network interface. The network interface 13 is typically used to establish a communication connection between the electronic apparatus 1 and other electronic devices.

The processing system is stored in the memory 11 and includes at least one computer readable instruction stored in the memory 11. The at least one computer readable instruction can be executable by the processor 12 to implement the methods of the embodiments of the present disclosure. The at least one computer readable instruction can be divided into different logical modules according to different functions implemented by the portions thereof.

A large database, such as an Oracle database, a mysql database, etc. is installed in the electronic apparatus. A large amount of data is stored in an original data table of the database, and the data is archived in order to enable the original data table to have no large amount of data overstocked. During archiving, a chain multi-thread mode is adopted. The chain refers to a multi-step operation, and that the next operation only can be executed after each step of operation is completed. In the first step of operation, an original data table is divided and a plurality of parallel threads are adopted to quickly write the finished data into the temporary table. In order to not scatter the data, the data conforming to the preset rule is further screened out through a single thread in the operation of the second step. The temporary table is divided in the third step of operation, and the data is quickly archived in a manner of multiple parallel threads. According to the method, the data can be quickly and efficiently archived, and the stability of data in the database system is ensured.

In one embodiment, the processing system, when executed by the processor 12, performs the following steps:

A first writing step, dividing an original data table in a database into a first quantity of preset partitions, and writing finished data in the partitions into a first temporary table which is pre-established according to a predetermined first processing mode by utilizing a second quantity of preset parallel threads, wherein the first quantity is larger than or equal to the second quantity;

In a specific embodiment, the original data table may be divided into 32 partitions, and the finished data in each partition is written into the first temporary table by utilizing eight parallel threads and processing data in the four partitions according to each thread. In other embodiments, the original data table can be divided into other numbers of partitions, and the data of the partition is processed by utilizing other numbers of parallel threads, so long as the number of the partitions is larger than or equal to the number of the parallel threads. The predetermined first processing mode processes data of at least one partition for each parallel thread, so that there is no idle thread, and in order to write the finished data in each partition into the pre-established first temporary table more quickly, preferably, each parallel thread processes the same number of partitions.

Each data in the original data table includes a corresponding flow ID, an identifier of whether processing is finished or not, an upper-level flow ID, a partition number, other fields and the like, which are shown in the following table 1:

TABLE 1

| flowid | identifier | upper-level flow ID | partition number | other fields |
|---|---|---|---|---|
| parentProcessId | yes | empty | 1 | . . . |

When the data in the original data table is processed by each parallel thread, the data are taken one by one according to a sequence. Then, the identifier of whether the processing is finished in the data is obtained. If the identifier is a finished identifier, the data can be completely written into the first temporary table, othewise if the identifier is an unfinished identifier, the data is reserved in the original data table. In the above table 1, if the data with the flow ID of "parentProcessId" is "yes", the data is finished data, and the data is written into the first temporary table.

In a preferred embodiment, the steps of dividing an original data table in a database into a first quantity of preset partitions include: establishing a partition function, determining a boundary value and a partition basis column on the basis of the first quantity, inputting the determined boundary value and the partition basis column into the partition function, and dividing the original data table on the basis of the input boundary value and the partition function of the partition basis column. The partition function is an independent object in a database, and rows of the original data table are mapped to a component area. When the partition function is created, the boundary value of the data partition and the partition basis column are indicated. The partition function is executed to divide the original data table;

A second writing step, obtaining data with superior and subordinate association in the first temporary table by utilizing a single thread after all the finished data in the partitions is written in the first temporary table, and writing the data with the superior and subordinate association into a second temporary table which is pre-established.

After all the finished data in the partitions is written in the first temporary table, that is, after the last-step writing operation is finished, a writing operation of the present step is executed. The data in the database have an incidence relation in the process, that is, superior and subordinate association exists. If the data is scattered, the specific significance is lost. If a multi-thread processing mode is adopted, the related data can be divided into different threads to be processed, and the data is scattered. Due to the fact that the data cannot be scattered, the data in the first temporary table is preprocessed by using a single thread in the writing operation of the step, and the data with the superior and subordinate association is written into a second temporary table which is established in advance, so that the associated data can be prevented from being scattered.

In an embodiment, the second writing step specifically includes:

obtaining flow ID identifiers of each piece of data in the first temporary table by utilizing the single thread, and analyzing whether each piece of data exists parent node data and sub-node data associated with the parent node data; obtaining a handle identifier of the parent node data, if the parent node data and the sub-node data associated with the parent node data exist; writing the data into the second temporary table as the superior and subordinate associated data, if the handle identifier of the parent node data is a finished identifier.

Figure 2:
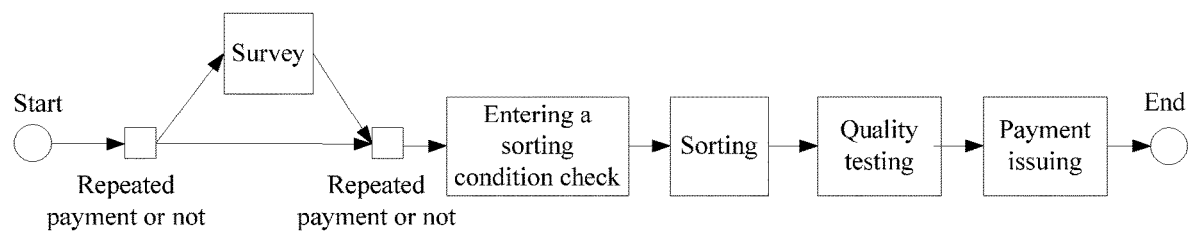
FIG. 2 is an exemplary diagram of one embodiment of parent node data in an original data table of a database.
Figure 3:
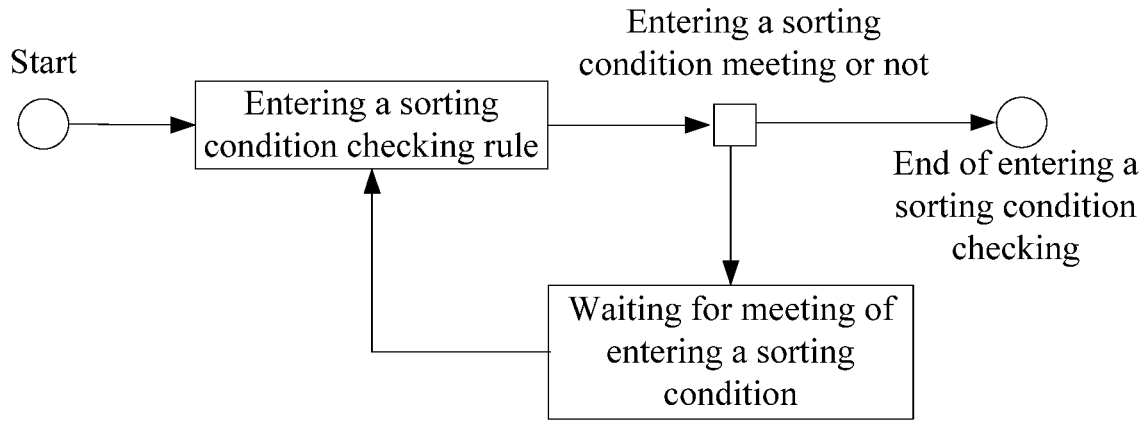
FIG. 3 is an exemplary diagram of one embodiment of sub-node data under the parent node data as shown in FIG. 2.

In a specific embodiment, as shown in FIG. 2, the parent node data is, for example, survey, entering a sorting condition check, sorting, quality testing and payment issuing in FIG. 2. As shown in FIG. 3, the "entering a sorting condition check" is taken as a parent node data, and then the corresponding sub-node data includes entering a sorting condition checking rule, and waiting for meeting of entering a sorting condition.

In the data of the whole process, each parent node allocates a parent process ID (parentProcessId), the sub-node under the parent node allocates a son process ID (sonProcessId), and the data under the parent node and the data under the corresponding sub-node are data with superior and subordinate incidence relation.

The data generated in one scene are shown in table 2 below:

TABLE 2

| flowid | identifier | upper-level flow ID | partition number | other fields |
|---|---|---|---|---|
| parentProcessId | yes | empty | 1 | . . . |
| sonProcessId | yes | parentProcessId | 1 | . . . |

The two pieces of data in table 2 are finished data, and enter the first temporary table through the first writing step. The second writing step analyzes the two pieces of data. Firstly, the data is obtained through the flow ID, and exists the parent node data and the sub-node data (ie, the data with superior and subordinate incidence relation). The parent node is identified as the finished data, so that the sub-node is certainly the finished data. Then writing the two pieces of data into the second temporary table.

The data generated in the other scene are shown in table 3 below:

TABLE 3

| flowid | identifier | upper-level flow ID | partition number | other fields |
|---|---|---|---|---|
| parentProcessId | yes | empty | 1 | ... |
| sonProcessId | yes | parentProcessId | 1 | ... |

The sub-node data of the two pieces of data in table 3 are finished data, and enter the first temporary table through the first writing step. Due to the parent node data is unfinished data, the data cannot be written into the first temporary table. The sub-node data is analyzed by the second writing step, being found existing superior and subordinate incidence relation. However, the corresponding parent node data does not exist in the first temporary table, which is unfinished data, so that the sub-node data cannot be written into the second temporary table.

An archiving step, dividing the second temporary table into a third quantity of preset partitions after all the data in the first temporary table is processed by utilizing the single thread, archiving the data in the partitions of the second temporary table into a pre-established archive table in the database according to a predetermined second processing mode by utilizing a fourth quantity of preset parallel threads, and deleting the data correspondingly written in the archive table in the original data table, wherein the third quantity is larger than or equal to the fourth quantity.

The archiving scheme of the step is executed, after all the data in the first temporary table is processed by utilizing the single thread, that is, after the last-step writing operation is finished.

In a specific embodiment, the second temporary table may be divided into 32 partitions, and the data in the partitions of the second temporary table is archived into a pre-established archive table in the database by utilizing eight parallel threads and processing data in the four partitions according to each thread. In other embodiments, the second temporary table can be divided into other numbers of partitions, and the data of the partition is processed by utilizing other numbers of parallel threads, so long as the number of the partitions is larger than or equal to the number of the parallel threads. The predetermined second processing mode can be the same as or different from the predetermined first processing mode and the predetermined second processing mode processes data of at least one partition for each parallel thread, so that there is no idle thread, and in order to archive the data in each partition into the archive table more quickly, preferably, each parallel thread processes the same number of partitions.

In a preferred embodiment, the same as the foregoing dividing principle of the original data table, the step of dividing the second temporary table into the third quantity of preset partitions includes: establishing a second partition function, determining a partition boundary value and a partition basis column based on the third quantity, inputting the determined boundary value and the partition basis column into the second partition function, and partitioning the second temporary table based on inputting the second partition function of the boundary value and the partition basis column.

In a preferred embodiment, in order to facilitate subsequent query data, so that the required data can be quickly found, classifying and storing the data in the archive table after the data in the partitions of the second temporary table is archived into the archive table in the database.

In a preferred embodiment, the processing system further performs the following steps when being executed by the processor: inquiring the original data table in the database according to an inquiry command, when receiving the inquiry command for querying the data in the database; and inquiring the data in the archive table in the database, on condition that the corresponding data is not found in the original data table.

According to traditional solutions, data in the database is archived into an archive database, namely, in another database. The original data table and the archive table are located in different database systems. Therefore, the archive table cannot be directly inquired after inquiring the original data table. The archive table of the present embodiment is built in the same database as the original data table. When inquiring the data in the database, the data may be inquired both in the original data table and the archive table, due to the original data table and the archive table are in the same database. Firstly, inquiring the original data table in the database. If the corresponding data is not found in the original data table, then inquiring the archive table in the database, so that inquiry of the archive table is supported. Thus, the availability of the archive table and the service performance is improved.

Compared with current technology, the present disclosure adopts a chain type multi-thread mode when archiving data in the database. The chain type multi-thread mode includes three-step operation, and the next operation can be executed only after each step of operation is completed. In the first step of operation, an original data table is divided and a plurality of parallel threads are adopted to write the data into a temporary table. Data conforming to conditions is screened out by utilizing a single thread in the operation of the second step. The temporary table is divided in the third step of operation, and the data is archived in an archive table of the database in a mode of multiple parallel threads. Data in the database can be quickly and efficiently archived, and the stability of the performance of the database system is kept.

Figure 4:
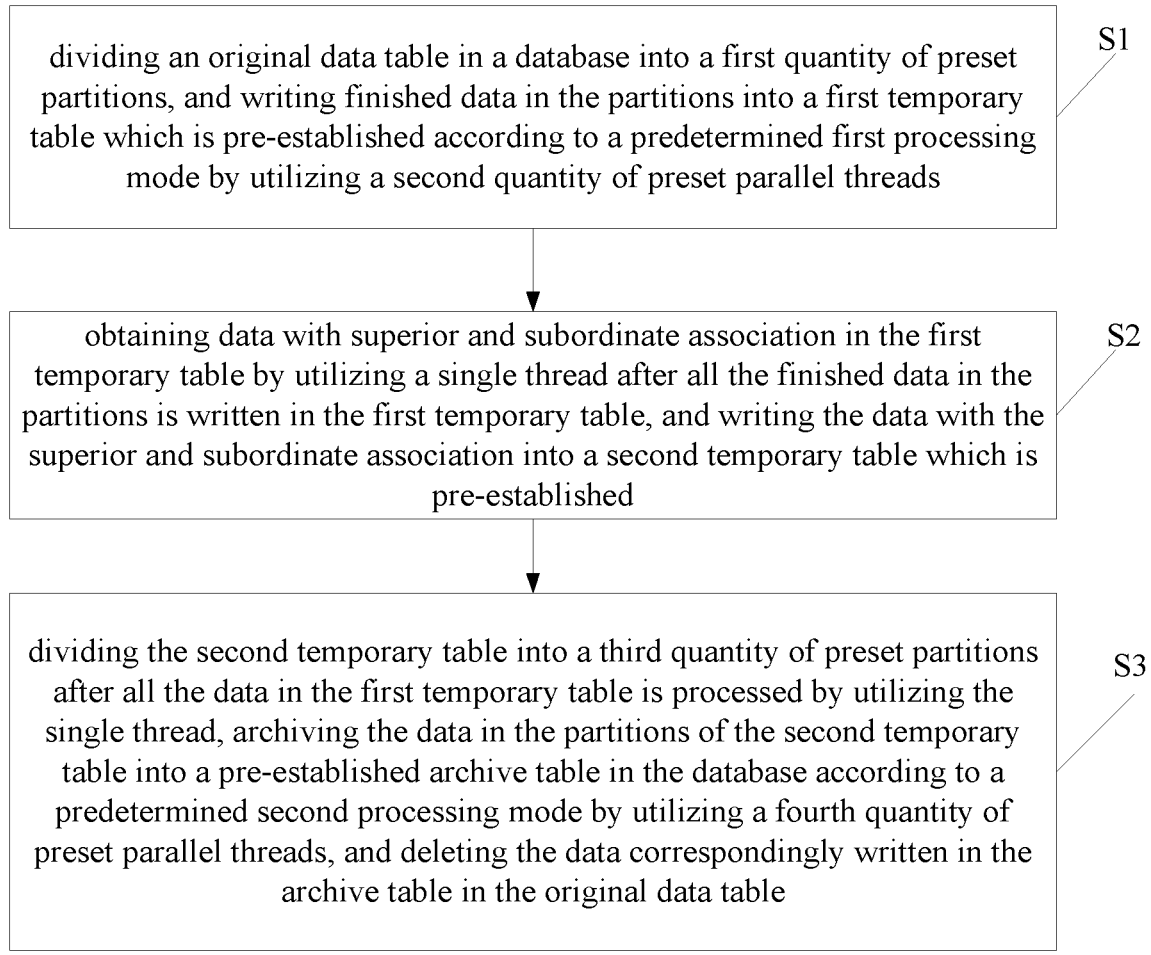
FIG. 4 is a schematic flowchart of one embodiment of a data chain archiving method according to the present disclosure.

As shown in FIG. 4, FIG. 4 is a schematic flowchart of one embodiment of a data chain archiving method according to the present disclosure. The data chain archiving method includes the following steps:

Step S1, dividing an original data table in a database into a first quantity of preset partitions, and writing finished data in the partitions into a first temporary table which is pre-established according to a predetermined first processing mode by utilizing a second quantity of preset parallel threads, wherein the first quantity is larger than or equal to the second quantity;

In a specific embodiment, the original data table may be divided into 32 partitions, and the finished data in each partition is written into the first temporary table by utilizing eight parallel threads and processing data in the four partitions according to each thread. In other embodiments, the original data table can be divided into other numbers of partitions, and the data of the partition is processed by utilizing other numbers of parallel threads, so long as the number of the partitions is larger than or equal to the number of the parallel threads. The predetermined first processing mode processes data of at least one partition for each parallel thread, so that there is no idle thread, and in order to write the finished data in each partition into the pre-established first temporary table more quickly, preferably, each parallel thread processes the same number of partitions.

Each data in the original data table includes a corresponding flow ID, an identifier of whether processing is finished or not, an upper-level flow ID, a partition number, other fields and the like, which are shown in the foregoing table 1 and details are not described herein.

When the data in the original data table is processed by each parallel thread, the data are taken one by one according to sequence, Then, the identifier of whether the processing is finished in the data is obtained. If the identifier is a finished identifier, the data can be completely written into the first temporary table, otherwise if the identifier is an unfinished identifier, the data is reserved in the original data table. In the above table 1, if the data with the flow ID of "parentProcessId" is "yes", the data is finished data, and the data is written into the first temporary table.

In a preferred embodiment, the steps of dividing an original data table in a database into a first quantity of preset partitions include establishing a partition function, determining a boundary value and a partition basis column on the basis of the first quantity, inputting the determined boundary value and the partition basis column into the partition function, and dividing the original data table on the basis of the input boundary value and the partition function of the partition basis column. The partition function is an independent object in a database, and rows of the original data table are mapped to a component area. When the partition function is created, the boundary value of the data partition and the partition basis column are indicated. The partition function is executed to divide the original data table;

S2, obtaining data with superior and subordinate association in the first temporary table by utilizing a single thread after all the finished data in the partitions is written in the first temporary table, and writing the data with the superior and subordinate association into a second temporary table which is pre-established;

After all the finished data in the partitions is written in the first temporary table, that is, after the last-step writing operation is finished, a writing operation of the present step is executed. The data in the database have an incidence relation in the process, that is, superior and subordinate association exists. If the data are scattered, the specific significance is lost. If a multi-thread processing mode is adopted, the related data can be divided into different threads to be processed, and the data is scattered. Due to the fact that the data cannot be scattered, the data in the first temporary table is preprocessed by using a single thread in the writing operation of the step, and the data with the superior and subordinate association is written into a second temporary table which is established in advance, so that the associated data can be prevented from being scattered.

In an embodiment, the step S2 specifically includes:
obtaining flow ID identifiers of each piece of data in the first temporary table by utilizing the single thread, and analyzing whether each piece of data exists parent node data and sub-node data associated with the parent node data; obtaining a handle identifier of the parent node data, if the parent node data and the sub-node data associated with the parent node data exist; writing the data into the second temporary table as the superior and subordinate associated data, if the handle identifier of the parent node data is a finished identifier.

In a specific embodiment, as shown in FIG. 2, the parent node data is, for example, survey, entering a sorting condition check, sorting, quality testing and payment issuing in FIG. 2. As shown in FIG. 3, the "entering a sorting condition check" is taken as a parent node data, and then the corresponding sub-node data includes entering a sorting condition checking rule, and waiting for meeting of entering a sorting condition.

In the data of the whole process, each parent node allocates a parent process ID (parentProcessId), the sub-node under the parent node allocates a son process ID (sonProcessId), and the data under the parent node and the data under the corresponding sub-node are data with superior and subordinate incidence relation.

The data generated in one scene are shown in the foregoing table 2. The two pieces of data in table 2 are finished data, and enter the first temporary table through the step S1. The step S2 analyzes the two pieces of data. Firstly, the data is obtained through the flow ID, and exists the parent node data and the sub-node data (i.e., the data with superior and subordinate incidence relation). The parent node is identified as the finished data, so that the sub-node is certainly the finished data. Then writing the two pieces of data into the second temporary table.

The data generated in the other scene are shown in the foregoing table 3. The sub-node data of the two pieces of data in table 3 are finished data, and enter the first temporary table through the step S1. Due to the parent node data is unfinished data, the data cannot be written into the first temporary table. The sub-node data is analyzed by the step S2, being found existing superior and subordinate incidence relation. However, the corresponding parent node data does not exist in the first temporary table, which is unfinished data, so that the sub-node data cannot be written into the second temporary table.

S3, dividing the second temporary table into a third quantity of preset partitions after all the data in the first temporary table is processed by utilizing the single thread, archiving the data in the partitions of the second temporary table into a pre-established archive table in the database according to a predetermined second processing mode by utilizing a fourth quantity of preset parallel threads, and deleting the data correspondingly written in the archive table in the original data table, wherein the third quantity is larger than or equal to the fourth quantity.

The archiving scheme of the step is executed, after all the data in the first temporary table is processed by utilizing the single thread, that is, after the last-step writing operation is finished.

In a specific embodiment, the second temporary table may be divided into 32 partitions, and the data in the partitions of the second temporary table is archived into a pre-established archive table in the database by utilizing eight parallel threads and processing data in the four partitions according to each thread. In other embodiments, the second temporary table can be divided into other numbers of partitions, and the data of the partition is processed by utilizing other numbers of parallel threads, so long as the number of the partitions is larger than or equal to the number of the parallel threads. The predetermined second processing mode can be the same as or different from the predetermined first processing mode and the predetermined second processing mode processes data of at least one partition for each parallel thread, so that there is no idle thread, and in order to archive the data in each partition into the archive table more quickly, preferably, each parallel thread processes the same number of partitions.

In a preferred embodiment, the same as the foregoing dividing principle of the original data table, the step of dividing the second temporary table into the third quantity of preset partitions includes: establishing a second partition function, determining a partition boundary value and a partition basis column based on the third quantity, inputting the determined boundary value and the partition basis column into the second partition function, and partitioning the second temporary table based on inputting the second partition function of the boundary value and the partition basis column.

In a preferred embodiment, in order to facilitate subsequent query data, so that the required data can be quickly found, classifying and storing the data in the archive table after the data in the partitions of the second temporary table is archived into the archive table in the database.

In a preferred embodiment, the processing system further performs the following steps when being executed by the processor: inquiring the original data table in the database according to an inquiry command, when receiving the inquiry command for querying the data in the database; and inquiring the data in the archive table in the database, on condition that the corresponding data is not found in the original data table.

According to traditional solutions, data in the database is archived into an archive database, namely, in another database. The original data table and the archive table are located in different database systems. Therefore, the archive table cannot be directly inquired after inquiring the original data table. The archive table of the present embodiment is built in the same database as the original data table. When inquiring the data in the database, the data may be inquired both in the original data table and the archive table, due to the original data table and the archive table are in the same database. Firstly, inquiring the original data table in the database. If the corresponding data is not found in the original data table, then inquiring the archive table in the database, so that inquiry of the archive table is supported. Thus, the availability of the archive table and the service performance is improved.

Compared with current technology, the present disclosure adopts a chain type multi-thread mode when archiving data in the database. The chain type multi-thread mode includes three-step operation, and the next operation can be executed only after each step of operation is completed. In the first step of operation, an original data table is divided and a plurality of parallel threads are adopted to write the data into a temporary table. Data conforming to conditions is screened out by utilizing a single thread in the operation of the second step. The temporary table is divided in the third step of operation, and the data is archived in an archive table of the database in a mode of multiple parallel threads. Data in the database can be quickly and efficiently archived, and the stability of the performance of the database system is kept.

The present disclosure further provides a computer-readable storage medium with a processing system stored thereon, which, when executed by a processor, is capable of performing the above steps of the method.

The serial numbers of the embodiment of the present disclosure are merely for the description purpose, and should not be construed as limitations to the superiority or inferiority of the embodiments.

Through the foregoing description of the embodiments, it is clear to persons skilled in the art that the present invention may be implemented by software plus necessary universal hardware, and definitely may also be implemented by hardware, but in many cases, the former implementation is preferred. Based on such an understanding, the technical solutions of the present invention essentially, or the part contributing to the prior art may be implemented in a form of a software product. The computer software product is stored in a storage medium (such as a ROM/RAM, a magnetic disk and a computer disk), and includes several instructions for instructing a terminal device (which may be a mobile phone, a computer, a server, an air conditioner, or a network device or the like) to perform the methods described in the embodiments of the present disclosure.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. An electronic apparatus comprising a memory, a processor connected to the memory and a processing system stored on the memory and running on the processor, the processing system, when being executed by the processor, performing the following steps:
    a first writing step, dividing an original data table in a database into a first quantity of preset partitions, and writing finished data in the partitions into a first temporary table which is pre-established according to a predetermined first processing mode by utilizing a second quantity of preset parallel threads, wherein the first quantity is larger than or equal to the second quantity;
    a second writing step, obtaining data with superior and subordinate association in the first temporary table by utilizing a single thread after all the finished data in the partitions is written in the first temporary table, and writing the data with the superior and subordinate association into a second temporary table which is pre-established;
    an archiving step, dividing the second temporary table into a third quantity of preset partitions after all the data in the first temporary table is processed by utilizing the single thread, archiving the data in the partitions of the second temporary table into a pre-established archive table in the database according to a predetermined second processing mode by utilizing a fourth quantity of preset parallel threads, and deleting the data correspondingly written in the archive table in the original data table, wherein the third quantity is larger than or equal to the fourth quantity.

2. The electronic apparatus according to claim 1, wherein the processing system further performs the following steps when being executed by the processor:
    inquiring the original data table in the database according to an inquiry command, when receiving the inquiry command for querying the data in the database; and
    inquiring the data in the archive table in the database, on condition that the corresponding data is not found in the original data table.

3. The electronic apparatus according to claim 2, wherein the second writing step specifically comprises:
    obtaining flow ID identifiers of each piece of data in the first temporary table by utilizing the single thread, and analyzing whether each piece of data exists parent node data and sub-node data associated with the parent node data;
    obtaining a handle identifier of the parent node data, on condition that the parent node data and the sub-node data associated with the parent node data exist;
    writing the data into the second temporary table as the superior and subordinate associated data, on condition that the handle identifier of the parent node data is a finished identifier.

4. The electronic apparatus according to claim 2, wherein the step of dividing the original data table in the database into the first quantity of preset partitions comprises:
establishing a first partition function, determining a partition boundary value and a partition basis column based on the first quantity, inputting the determined boundary value and the partition basis column into the first partition function, and partitioning the original data table based on inputting the first partition function of the boundary value and the partition basis column;
the step of dividing the second temporary table into a third quantity of preset partitions comprises:
establishing a second partition function, determining a partition boundary value and a partition basis column based on the third quantity, inputting the determined boundary value and the partition basis column into the second partition function, and partitioning the second temporary table based on inputting the second partition function of the boundary value and the partition basis column.

5. The electronic apparatus according to claim 1, wherein the second writing step specifically comprises:
obtaining flow ID identifiers of each piece of data in the first temporary table by utilizing the single thread, and analyzing whether each piece of data exists parent node data and sub-node data associated with the parent node data;
obtaining a handle identifier of the parent node data, on condition that the parent node data and the sub-node data associated with the parent node data exist;
writing the data into the second temporary table as the superior and subordinate associated data, on condition that the handle identifier of the parent node data is a finished identifier.

6. The electronic apparatus according to claim 1, wherein the step of dividing the original data table in the database into the first quantity of preset partitions comprises:
establishing a first partition function, determining a partition boundary value and a partition basis column based on the first quantity, inputting the determined boundary value and the partition basis column into the first partition function, and partitioning the original data table based on inputting the first partition function of the boundary value and the partition basis column;
the step of dividing the second temporary table into a third quantity of preset partitions comprises:
establishing a second partition function, determining a partition boundary value and a partition basis column based on the third quantity, inputting the determined boundary value and the partition basis column into the second partition function, and partitioning the second temporary table based on inputting the second partition function of the boundary value and the partition basis column.

7. The electronic apparatus according to claim 1, wherein the processing system further performs the following step when being executed by the processor:
classifying and storing the data in the archive table.

8. A data chain archiving method comprising:
S1, dividing an original data table in a database into a first quantity of preset partitions, and writing finished data in the partitions into a first temporary table which is pre-established according to a predetermined first processing mode by utilizing a second quantity of preset parallel threads, wherein the first quantity is larger than or equal to the second quantity;
S2, obtaining data with superior and subordinate association in the first temporary table by utilizing a single thread after all the finished data in the partitions is written in the first temporary table, and writing the data with the superior and subordinate association into a second temporary table which is pre-established;
S3, dividing the second temporary table into a third quantity of preset partitions after all the data in the first temporary table is processed by utilizing the single thread, archiving the data in the partitions of the second temporary table into a pre-established archive table in the database according to a predetermined second processing mode by utilizing a fourth quantity of preset parallel threads, and deleting the data correspondingly written in the archive table in the original data table, wherein the third quantity is larger than or equal to the fourth quantity.

9. The data chain archiving method according to claim 8, after the step S3, the method further comprising:
inquiring the original data table in the database according to an inquiry command, when receiving the inquiry command for querying the data in the database; and inquiring the data in the archive table in the database, on condition that the corresponding data is not found in the original data table.

10. The data chain archiving method according to claim 9, wherein the step S2 comprises:
obtaining flow ID identifiers of each piece of data in the first temporary table by utilizing a single thread, and analyzing whether each piece of data exists parent node data and sub-node data associated with the parent node data;
obtaining a handle identifier of the parent node data, on condition that the parent node data and the sub-node data associated with the parent node data exist;
writing the data into the second temporary table as the superior and subordinate associated data, on condition that the handle identifier of the parent node data is a finished identifier.

11. The data chain archiving method according to claim 9, wherein the step of dividing the original data table in a database into the first quantity of preset partitions comprises:
establishing a first partition function, determining a partition boundary value and a partition basis column based on the first quantity, inputting the determined boundary value and the partition basis column into the first partition function, and partitioning the original data table based on inputting the first partition function of the boundary value and the partition basis column;
the step of dividing the second temporary table into a third quantity of preset partitions comprising:
establishing a second partition function, determining a partition boundary value and a partition basis column based on the third quantity, inputting the determined boundary value and the partition basis column into the second partition function, and partitioning the second temporary table based on inputting the second partition function of the boundary value and the partition basis column.

12. The data chain archiving method according to claim 8, wherein the step S2 comprises:
obtaining flow ID identifiers of each piece of data in the first temporary table by utilizing a single thread, and analyzing whether each piece of data exists parent node data and sub-node data associated with the parent node data;

obtaining a handle identifier of the parent node data, on condition that the parent node data and the sub-node data associated with the parent node data exist;

writing the data into the second temporary table as the superior and subordinate associated data, on condition that the handle identifier of the parent node data is a finished identifier.

13. The data chain archiving method according to claim 8, wherein the step of dividing the original data table in a database into the first quantity of preset partitions comprises:

establishing a first partition function, determining a partition boundary value and a partition basis column based on the first quantity, inputting the determined boundary value and the partition basis column into the first partition function, and partitioning the original data table based on inputting the first partition function of the boundary value and the partition basis column;

the step of dividing the second temporary table into a third quantity of preset partitions comprising:

establishing a second partition function, determining a partition boundary value and a partition basis column based on the third quantity, inputting the determined boundary value and the partition basis column into the second partition function, and partitioning the second temporary table based on inputting the second partition function of the boundary value and the partition basis column.

14. The data chain archiving method according to claim 8, wherein the data in the archive table is classified and stored.

15. A non-transitory computer-readable storage medium with a processing system stored thereon, which, when being executed by a processor, performing the following steps:

a first writing step, dividing an original data table in a database into a first quantity of preset partitions, and writing finished data in the partitions into a first temporary table which is pre-established according to a predetermined first processing mode by utilizing a second quantity of preset parallel threads, wherein the first quantity is larger than or equal to the second quantity;

a second writing step, obtaining data with superior and subordinate association in the first temporary table by utilizing a single thread after all the finished data in the partitions is written in the first temporary table, and writing the data with the superior and subordinate association into a second temporary table which is pre-established;

an archiving step, dividing the second temporary table into a third quantity of preset partitions after all the data in the first temporary table is processed by utilizing the single thread, archiving the data in the partitions of the second temporary table into a pre-established archive table in the database according to a predetermined second processing mode by utilizing a fourth quantity of preset parallel threads, and deleting the data correspondingly written in the archive table in the original data table, wherein the third quantity is larger than or equal to the fourth quantity.

16. The non-transitory computer-readable storage medium according to claim 15, wherein the processing system further performs the following steps when being executed by the processor:

inquiring the original data table in the database according to an inquiry command, when receiving the inquiry command for querying the data in the database; and inquiring the data in the archive table in the database, on condition that the corresponding data is not found in the original data table.

17. The non-transitory computer-readable storage medium according to claim 16, wherein the second writing step specifically comprises:

obtaining flow ID identifiers of each piece of data in the first temporary table by utilizing the single thread, and analyzing whether each piece of data exists parent node data and sub-node data associated with the parent node data;

obtaining a handle identifier of the parent node data, on condition that the parent node data and the sub-node data associated with the parent node data exist;

writing the data into the second temporary table as the superior and subordinate associated data, on condition that the handle identifier of the parent node data is a finished identifier.

18. The non-transitory computer-readable storage medium according to claim 15, wherein the second writing step specifically comprises:

obtaining flow ID identifiers of each piece of data in the first temporary table by utilizing the single thread, and analyzing whether each piece of data exists parent node data and sub-node data associated with the parent node data;

obtaining a handle identifier of the parent node data, on condition that the parent node data and the sub-node data associated with the parent node data exist;

writing the data into the second temporary table as the superior and subordinate associated data, on condition that the handle identifier of the parent node data is a finished identifier.

19. The non-transitory computer-readable storage medium according to claim 15, wherein the step of dividing the original data table in the database into the first quantity of preset partitions comprises:

establishing a first partition function, determining a partition boundary value and a partition basis column based on the first quantity, inputting the determined boundary value and the partition basis column into the first partition function, and partitioning the original data table based on inputting the first partition function of the boundary value and the partition basis column;

the step of dividing the second temporary table into the third quantity of preset partitions comprising:

establishing a second partition function, determining a partition boundary value and a partition basis column based on the third quantity, inputting the determined boundary value and the partition basis column into the second partition function, and partitioning the second temporary table based on inputting the second partition function of the boundary value and the partition basis column.

20. The non-transitory computer-readable storage medium according to claim 15, wherein the processing system further performs the following step when being executed by the processor: classifying and storing the data in the archive table.

* * * * *